(12) United States Patent
Ogawa

(10) Patent No.: US 8,334,051 B2
(45) Date of Patent: Dec. 18, 2012

(54) ADHESION METHOD, AND BIOCHEMICAL CHIP AND OPTICAL COMPONENT MADE BY THE SAME

(75) Inventor: Kazufumi Ogawa, Awa (JP)

(73) Assignee: Empire Technology Development LLC, Wilmington, DE (US)

( * ) Notice: Subject to any disclaimer, the term of this patent is extended or adjusted under 35 U.S.C. 154(b) by 390 days.

(21) Appl. No.: 12/601,968

(22) PCT Filed: May 28, 2008

(86) PCT No.: PCT/JP2008/059808
§ 371 (c)(1),
(2), (4) Date: Nov. 25, 2009

(87) PCT Pub. No.: WO2008/149745
PCT Pub. Date: Dec. 11, 2008

(65) Prior Publication Data
US 2010/0196721 A1    Aug. 5, 2010

(30) Foreign Application Priority Data
May 30, 2007   (JP) ................................ 2007-144046

(51) Int. Cl.
*B29C 65/14* (2006.01)
*B32B 9/00* (2006.01)
*B32B 33/00* (2006.01)

(52) U.S. Cl. ........ 428/333; 428/420; 428/447; 428/448; 156/273.5; 156/275.5

(58) Field of Classification Search .................. None
See application file for complete search history.

(56) References Cited

U.S. PATENT DOCUMENTS
6,190,778 B1   2/2001   Batz-Sohn et al.

FOREIGN PATENT DOCUMENTS
| JP | 11-335631 | 12/1999 |
|----|-----------|---------|
| JP | 2003-246971 | 9/2003 |
| JP | 2005-221478 | 8/2005 |
| JP | 2007-161913 | 6/2007 |
| JP | 2008-019348 | 1/2008 |

OTHER PUBLICATIONS
International Search Report for PCT/JP2008/059808, mailed Aug. 26, 2008 (English translation included).
International Preliminary Report on Patentability for PCT/JP2008/059808 mailed Jan. 21, 2010 (English translation).

*Primary Examiner* — Ramsey Zacharia
(74) *Attorney, Agent, or Firm* — Foley & Lardner LLP

(57) ABSTRACT

An adhesion method capable of strongly adhering two members without using an adhesive and without impairing a fine structure or optical properties of a joining surface, and a biochemical chip and optical component made by the same are provided.
The adhesion method includes step A of forming a coating film 13 of a first film compound having a first photoreactive functional group on a first joining surface 11 of a first member 21, step B of forming a coating film 14 of a second film compound having a second photoreactive functional group on a second joining surface 12 of a second member 22, and step C of bringing the first joining surface 11 into contact by pressure with the second joining surface 12 while setting a coupling agent having at least one coupling reactive group that forms a covalent bond with the first photoreactive functional group and the second photoreactive functional group by light irradiation to be in contact with the first and second photoreactive functional groups, and conducting light irradiation to form covalent bonds.

12 Claims, 3 Drawing Sheets

IN THE FIGURE, a REPRESENTS

IN THE FIGURE,  REPRESENTS

IN THE FIGURE, b REPRESENTS

US 8,334,051 B2

ADHESION METHOD, AND BIOCHEMICAL CHIP AND OPTICAL COMPONENT MADE BY THE SAME

CROSS-REFERENCE TO RELATED APPLICATIONS

The present application is a U.S. national stage application claiming the benefit of International Application No. PCT/JP2008/059808, filed on May 28, 2008, which claims the benefit of Japanese Application No. 2007-144046, filed on May 30, 2007, the entire contents of which are incorporated herein by reference in their entireties

TECHNICAL FIELD

The present invention relates to an adhesion method and a biochemical chip and optical component made by the same. More specifically, the present invention relates to a method of achieving adhesion without using an adhesive by introducing a photoreactive functional group into a surface of each of joining surfaces by forming a coating film made of a film compound having the photoreactive functional group, and chemically bonding the joining surfaces via bonds formed between a coupling agent and the photoreactive functional group, and a biochemical chip and optical component made by the same.

BACKGROUND ART

A technique in which two members are adhered to each other by applying an adhesive to one of or both of joining surfaces, pressure-bonding the joining surfaces to each other, and curing the adhesive is generally well known (see, for example, Patent Document 1).

However, adhesives generally have a high viscosity. When such an adhesive is applied to joining surfaces, curing is gradually carried out. Therefore, it is difficult to correct the aligned position of the joining surfaces after compression bonding. Furthermore, when a fine structure (for example, a hole or groove having a size on the order of microns) is provided on at least one of the joining surfaces, for example, as in the case of a member of a biochemical chip, it is very difficult to achieve adhesion without filling the fine structure with a fluid adhesive and without clearance. Furthermore, by a known method using an adhesive, it is also very difficult to achieve adhesion of an optical member such as a lens without degrading optical properties thereof because the thickness of the adhesive or the like on a joining surface becomes uneven.

As an adhesion method without using an adhesive, for example, Patent Document 2 discloses a method of adhering foil-like or film-like materials to each other with an organic monomolecular film there between. In the method described in this document, for example, aluminum foils in which an organic monomolecular film having an aliphatic hydrocarbon group is bonded to a surface thereof adhere to each other through intermolecular force and a negative pressure.

Patent Document 1: Japanese Unexamined Patent Application Publication No. 2005-221478
Patent Document 2: Japanese Unexamined Patent Application Publication No. 2003-246971

DISCLOSURE OF INVENTION

Problem to be Solved by the Invention

However, in the method described in Patent Document 2 in which adhesion is achieved utilizing intermolecular force acting on an organic monomolecular film and a negative pressure during pressure bonding of members, the adhesive strength is too low, and thus the method cannot be applied to adhesion of a biochemical chip, an optical component, or the like.

The present invention has been made in view of the above problem, and it is an object of the present invention to provide an adhesion method capable of strongly adhering two members without using an adhesive and without impairing a fine structure or optical properties of a joining surface, and a biochemical chip and optical component made by the same.

Means for Solving the Problems

An adhesion method according to a first invention that achieves the above object is a method of adhering a first joining surface of a first member to a second joining surface of a second member including step A of bringing a first film compound having a first photoreactive functional group at an end of its molecule and a first surface bonding group at another end thereof into contact with the first joining surface to form a covalent bond between the first surface bonding group and a surface functional group of the first joining surface, thereby forming a coating film of the first film compound on the first joining surface; step B of bringing a second film compound having a second photoreactive functional group at an end of its molecule and a second surface bonding group at another end thereof into contact with the second joining surface to form a covalent bond between the second surface bonding group and a surface functional group of the second joining surface, thereby forming a coating film of the second film compound on the second joining surface; and step C of bringing the first joining surface having the coating film of the first film compound thereon into contact by pressure with the second joining surface having the coating film of the second film compound thereon while setting a coupling agent having at least one first coupling reactive group that forms a covalent bond with the first photoreactive functional group by light irradiation and at least one second coupling reactive group that forms a covalent bond with the second photoreactive functional group by light irradiation to be in contact with the first functional photoreactive group and the second photoreactive functional group, and conducting light irradiation to form covalent bonds between the first photoreactive functional group and the first coupling reactive group and between the second photoreactive functional group and the second coupling reactive group.

In the adhesion method according to the first invention, in step C, first, light irradiation may be conducted while setting the coupling agent to be in contact with the coating film of the first film compound formed on the first joining surface to form a covalent bond between the first photoreactive functional group and the first coupling reactive group, thereby forming a coating film of the coupling agent on the surface of the coating film of the first film compound, and subsequently, light irradiation may be conducted while setting the first joining surface further having the coating film of the coupling agent thereon to be in contact by pressure with the second joining surface having the coating film of the second film compound thereon to form a covalent bond between the second photoreactive functional group and the second coupling reactive group.

In the adhesion method according to the first invention, each of the first photoreactive functional group, the second photoreactive functional group, the first coupling reactive group, and the second coupling reactive group may be either a chalconyl group or a cinnamoyl group.

In the adhesion method according to the first invention, each of the first photoreactive functional group, the second photoreactive functional group, the first coupling reactive group, and the second coupling reactive group may be a diacetylene group.

In the adhesion method according to the first invention, each of the first surface bonding group and the second surface bonding group may be either an alkoxysilyl group or a chlorosilyl group.

In the adhesion method according to the first invention, it is preferable that at least one of the first member and the second member is transparent, and in step C, light irradiation is conducted through the at least one transparent member.

A biochemical chip according to a second invention includes a first member and a second member, wherein, on a first joining surface of the first member, a coating film of a first film compound having a first photoreactive functional group at an end of its molecule and bonded to the first joining surface at another end thereof is provided, on a second joining surface of the second member, a coating film of a second film compound having a second photoreactive functional group at an end of its molecule and bonded to the second joining surface at another end thereof is provided, the first photoreactive functional group and the second photoreactive functional group are bonded to each other via bonds formed between the first photoreactive functional group and a coupling agent having at least one first coupling reactive group that forms a covalent bond by a coupling reaction with the first photoreactive functional group and at least one second coupling reactive group that forms a covalent bond by a coupling reaction with the second photoreactive functional group and between the second photoreactive functional group and the coupling agent, and the first joining surface is adhered to the second joining surface via the formed bonds.

In the present invention, the term "biochemical chip" refers to a chemical device for performing an operation such as mixing, synthesis, extraction, purification, analysis, or measurement of a compound in a channel having a width on the order of micrometers. Specific examples thereof include a chemical chip, a biochip, a biochemical electrophoresis chip, a biochemical reactor, a biochemical fluid system, and a DNA chip, which are used in a chemical experiment, a bio-experiment, medical diagnosis, and the like.

In the biochemical chip according to the second invention, each of the first photoreactive functional group, the second photoreactive functional group, the first coupling reactive group, and the second coupling reactive group may be either a chalconyl group or a cinnamoyl group.

In the biochemical chip according to the second invention, each of the first photoreactive functional group, the second photoreactive functional group, the first coupling reactive group, and the second coupling reactive group may be a diacetylene group.

In the biochemical chip according to the second invention, each of the coating film of the first film compound and the coating film of the second film compound is preferably a monomolecular film.

An optical component according to a third invention includes a first member and a second member, wherein, on a first joining surface of the first member, a coating film of a first film compound having a first photoreactive functional group at an end of its molecule and bonded to the first joining surface at another end thereof is provided, on a second joining surface of the second member, a coating film of a second film compound having a second photoreactive functional group at an end of its molecule and bonded to the second joining surface at another end thereof is provided, the first photoreactive functional group and the second photoreactive functional group are bonded to each other via bonds formed between the first photoreactive functional group and a coupling agent having at least one first coupling reactive group that forms a covalent bond by a coupling reaction with the first photoreactive functional group and at least one second coupling reactive group that forms a covalent bond by a coupling reaction with the second photoreactive functional group and between the second photoreactive functional group and the coupling agent, and the first joining surface is adhered to the second joining surface via the formed bonds.

In the present invention, the term "optical component" refers to any light-transmissive member used in an optical instrument. Specific examples thereof include a lens, a prism, an optical fiber, and an optical recording medium.

In the optical component according to the third invention, each of the first photoreactive functional group, the second photoreactive functional group, the first coupling reactive group, and the second coupling reactive group may be either a chalconyl group or a cinnamoyl group.

In the optical component according to the third invention, each of the first photoreactive functional group, the second photoreactive functional group, the first coupling reactive group, and the second coupling reactive group may be a diacetylene group.

In the optical component according to the third invention, each of the coating film of the first film compound and the coating film of the second film compound is preferably a monomolecular film.

Effect of the Invention

In some embodiments of the adhesion methods described herein, a first film compound and a second film compound covering a first joining surface and a second joining surface, respectively, are strongly bonded to the first joining surface and the second joining surface, respectively, via covalent bonds, and a first photoreactive functional group and a second photoreactive functional group are strongly bonded to each other via covalent bonds formed with a coupling agent. Accordingly, the first joining surface can be strongly bonded to the second joining surface.

In addition, no adhesive is used, and thus the aligned position can be easily corrected after contacting by pressure and the alignment of joining surfaces can be performed with high accuracy. Furthermore, adhesion can be achieved without impairing a fine structure formed on a joining surface or optical properties. Therefore, the methods can be suitably used in adhesion of a biochemical chip or an optical component.

In particular, in one embodiment of the adhesion method described herein, first, the coupling agent is brought into contact with the coating film of the first film compound formed on the first joining surface to form a covalent bond between the first photoreactive functional group and the first coupling reactive group, thereby forming a coating film of the coupling agent on the surface of the coating film of the first film compound, and the first joining surface further having the coating film of the coupling agent thereon is then brought into contact by pressure with the second joining surface having the coating film of the second film compound thereon to form a covalent bond between the second photoreactive functional group and the second coupling reactive group. Accordingly, excess coupling agent can be removed before adhesion. Therefore, elution of excess coupling agent after adhesion and degradation of optical properties due to discoloration can be suppressed.

In one embodiment of the adhesion method described herein, each of the first photoreactive functional group, the second photoreactive functional group, the first coupling reactive group, and the second coupling reactive group is either a chalconyl group or a cinnamoyl group, which forms covalent bonds by photodimerization. Accordingly, strong covalent bonds can be formed by light irradiation.

In one embodiment of the adhesion method described herein, each of the first photoreactive functional group, the second photoreactive functional group, the first coupling reactive group, and the second coupling reactive group is a diacetylene group, which forms a covalent bond by photopolymerization. Accordingly, a strong covalent bond can be formed by light irradiation.

In one embodiment of the adhesion method described herein, each of the first surface bonding group and the second surface bonding group is either an alkoxysilyl group or a chlorosilyl group. Accordingly, they can form a strong covalent bond via a covalent bond (siloxane bond) on a joining surface having an active hydrogen group such as a hydroxyl group as a surface bonding group.

In one embodiment of the adhesion method described herein, in step C, light irradiation is conducted through a transparent member to form a covalent bond. Accordingly, a special light irradiation apparatus is not necessary, and thus the method can be used for adhesion of joining surfaces having a large area.

In so0me embodiments of the biochemical chips described herein, a first film compound and a second film compound covering a first joining surface and a second joining surface, respectively, are strongly bonded to the first joining surface and the second joining surface, respectively, via covalent bonds, and a first photoreactive functional group and a second photoreactive functional group are strongly bonded to each other via covalent bonds formed with a coupling agent. Accordingly, the first joining surface can be strongly bonded to the second joining surface. In addition, adhesion is achieved without using an adhesive, and thus the biochemical chips can be made without clogging a groove-like or hole-like fluid channel provided on a joining surface and having a size on the order of micrometers.

In one embodiment of the biochemical chip described herein, each of the first photoreactive functional group, the second photoreactive functional group, the first coupling reactive group, and the second coupling reactive group is either a chalconyl group or a cinnamoyl group, which forms covalent bonds by photodimerization. Accordingly, strong covalent bonds can be formed by light irradiation.

In one embodiment of the biochemical chip described herein, each of the first photoreactive functional group, the second photoreactive functional group, the first coupling reactive group, and the second coupling reactive group is a diacetylene group, which forms a covalent bond by photopolymerization. Accordingly, a strong covalent bond can be formed by light irradiation.

In one embodiment of the biochemical chip described herein, each of the coating film of the first film compound and the coating film of the second film compound is a monomolecular film. Accordingly, the dimensional accuracy in the adhesion can be improved.

In some embodiments of the optical components described herein, a first film compound and a second film compound covering a first joining surface and a second joining surface, respectively, are strongly bonded to the first joining surface and the second joining surface, respectively, via covalent bonds, and a first photoreactive functional group and a second photoreactive functional group are strongly bonded to each other via covalent bonds formed with a coupling agent. Accordingly, the first joining surface can be strongly bonded to the second joining surface. In addition, adhesion is achieved without using an adhesive, and thus the optical components can be made without impairing optical properties of the joining surfaces.

In one embodiment of the optical component described herein, each of the first photoreactive functional group, the second photoreactive functional group, the first coupling reactive group, and the second coupling reactive group is either a chalconyl group or a cinnamoyl group, which forms covalent bonds by photodimerization. Accordingly, strong covalent bonds can be formed by light irradiation.

In one embodiment of the optical component described herein, each of the first photoreactive functional group, the second photoreactive functional group, the first coupling reactive group, and the second coupling reactive group is a diacetylene group, which forms a covalent bond by photopolymerization. Accordingly, a strong covalent bond can be formed by light irradiation.

In one embodiment of the optical component described herein, each of the coating film of the first film compound and the coating film of the second film compound is a monomolecular film. Accordingly, the dimensional accuracy in the adhesion can be improved.

BEST MODES FOR CARRYING OUT THE INVENTION

Figure 1:
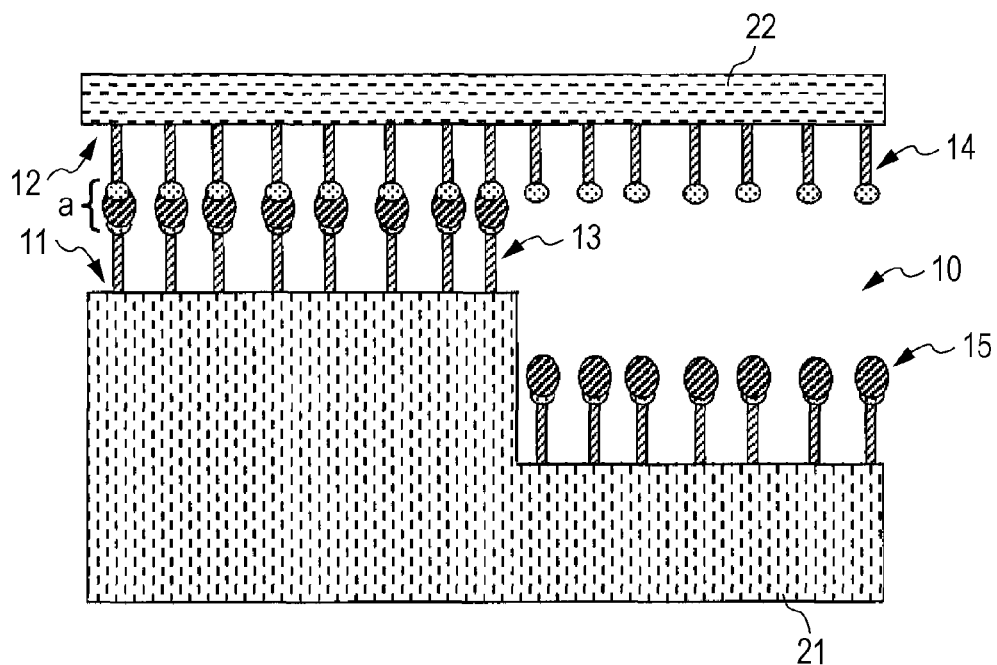
FIG. 1 is an explanatory view that schematically shows a partial structure of a cross section of a biochemical chip according to an embodiment of the present invention.
Figure 1:
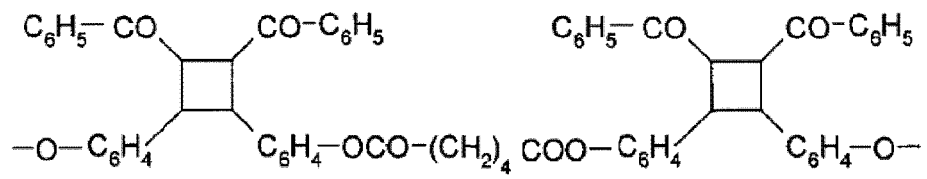
Figure 2:
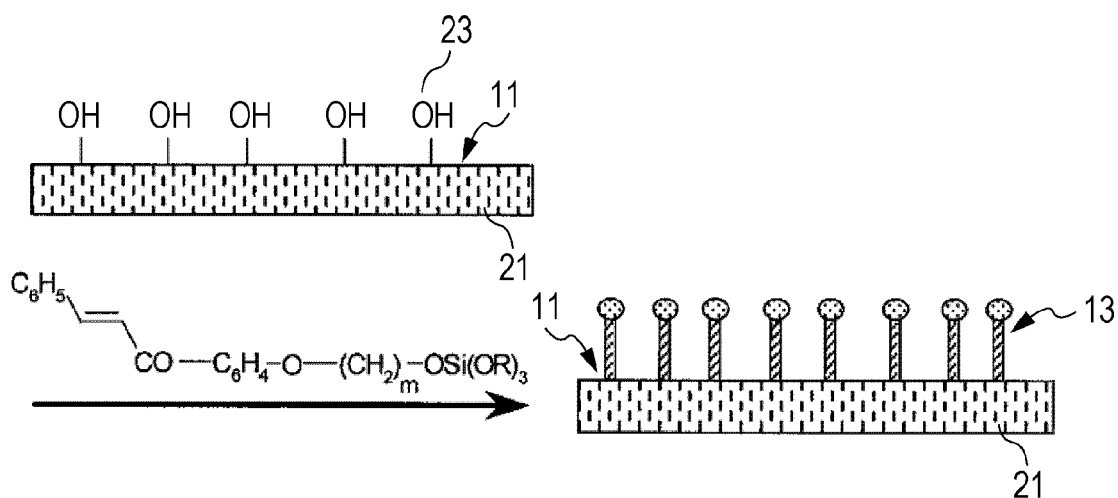
FIG. 2 is a conceptual view in which the vicinity of a surface of a first base material before and after formation of a coating film of a first film compound is enlarged to the molecular level in order to illustrate a step of forming the coating film of the first film compound on a first joining surface in a method of producing the biochemical chip.
Figure 2:
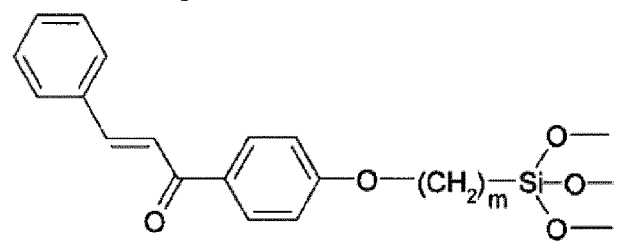
Figure 3:
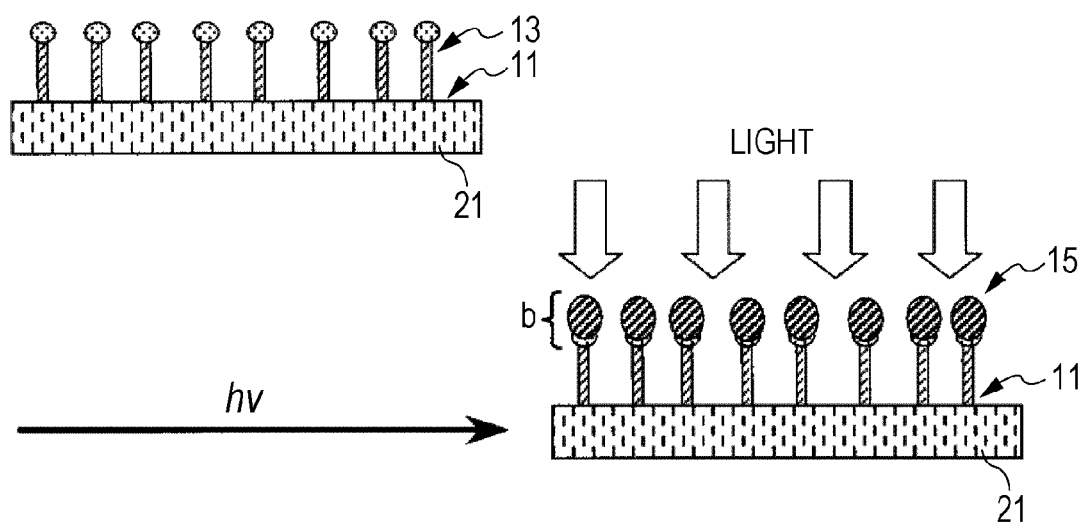
FIG. 3 is a conceptual view in which the vicinity of the surface of the first base material before and after formation of a coating film of a coupling agent is enlarged to the molecular level in order to illustrate a step of forming the coating film of the coupling agent on the surface of the first film compound in the method of producing the biochemical chip.
Figure 3:
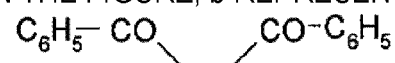
Figure 3:
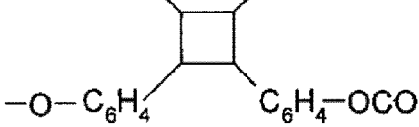
Figure 3:
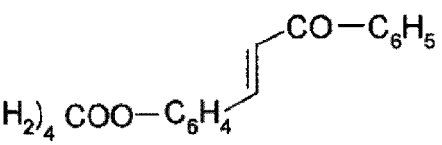

Embodiments of the present invention will now be described with reference to the drawings to achieve the understanding of the present invention. FIG. 1 is an explanatory view that schematically shows a partial structure of a cross section of a biochemical chip according to an embodiment of the present invention. FIG. 2 is a conceptual view in which the vicinity of a surface of a first base material before and after formation of a coating film of a first film compound is enlarged to the molecular level in order to illustrate a step of forming the coating film of the first film compound on a first joining surface in a method of producing the biochemical chip. FIG. 3 is a conceptual view in which the vicinity of the surface of the first base material before and after formation of a coating film of a coupling agent is enlarged to the molecular level in order to illustrate the step of forming the coating film of the coupling agent on the surface of the first film compound in the method of producing the biochemical chip.

As shown in FIGS. 1 to 3, a biochemical chip 10 according to an embodiment of the present invention includes a first base material (an example of a first member) 21 and a second base material 22 (an example of a second member) 22. On a first joining surface 11 of the first base material 21, a monomolecular film 13 which is an example of a coating film of a first film compound that has a chalconyl group (an example of a first photoreactive functional group) at one end of its molecule and that is bonded to the first joining surface 11 at another end thereof is provided. On a second joining surface 12 of the second base material 22, a monomolecular film 14 which is an example of a coating film of a second film compound that has a chalconyl group (an example of a second photoreactive functional group) at one end of its molecule and that is bonded to the second joining surface 12 at another end thereof is provided. The chalconyl group on the monomolecular film 13 of the first film compound and the chalconyl group on the monomolecular film 14 of the second film compound are bonded to each other via covalent bonds formed by photodimerization reactions between each of the chalconyl groups and a coupling agent having two or more chalconyl groups (an example of a coupling reactive group). The first joining surface 11 and the second joining surface 12 adhere to each other via the bonds formed as described above.

The biochemical chip 10 is produced by an adhesion method including step A (see FIG. 2) of bringing a first film compound having a chalconyl group at an end of its molecule and an alkoxysilyl group (an example of a first surface bonding group) at another end thereof into contact with a first joining surface 11 of a first base material 21 to form a monomolecular film 13 of the first film compound via a bond formed between the alkoxysilyl group and a hydroxyl group (an example of a surface functional group containing active hydrogen) 23; step B of forming a monomolecular film 14 of a second film compound on a second joining surface 12 of a second base material 22 by the same method as that in step A; and step C of, first, bringing a coupling agent in the form of a monomolecular film formed by using a Langmuir-Blodgett (LB) method or the like into contact with the monomolecular film 13 of the first film compound to form a covalent bond by photodimerization of chalconyl groups, thereby forming a coating film 15 of the coupling agent in the form of a monomolecular film on the surface of the monomolecular film 13 of the first film compound; and then bringing the first joining surface 11 further having the coating film 15 of the coupling agent thereon into contact by pressure with the second joining surface 12 having the monomolecular film 14 of the second film compound thereon to form a covalent bond by photodimerization of chalconyl groups.

Steps A to C will now be described in more detail.

In step A, a film compound having a chalconyl group derived from chalcone, which forms covalent bonds by a photodimerization reaction as shown in Chem. 1 below, is brought into contact with a first joining surface 11 of a first base material 21 made of glass to form a monomolecular film 13 of the film compound having a chalconyl group on the surface of the first joining surface 11 (see FIG. 2).

The size and the shape of the first base material 21 that can be used are not particularly limited, but the first joining surface 11 preferably has a mirror-finished surface having a surface roughness of 1 μm or less, and preferably 100 nm or less.

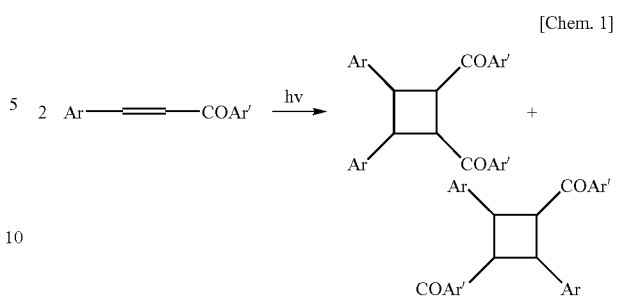

[Chem. 1]

Note that, in Chem. 1, Ar and Ar' each represent a benzene ring.

As the film compound having a chalconyl group, any compound that can be adsorbed or bonded to a surface of the first base material 21 to form a monomolecular film by self-assembly can be used. An alkoxysilane compound in which a chalconyl group is disposed at an end of a straight-chain alkylene group and an alkoxysilyl group (an example of a first surface bonding group) is disposed at another end thereof, and which is represented by Chem. 2 or Chem. 3 below is preferable. A chalconyl group has two benzene rings, and the alkylene group may be bonded to either of the benzene rings, as shown in Chem. 2 and Chem. 3.

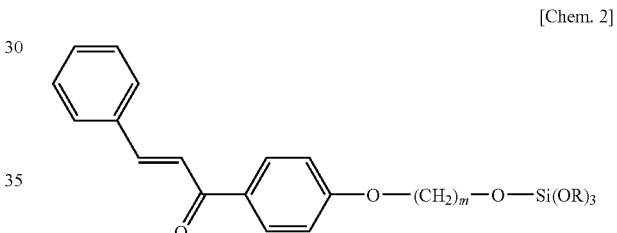

[Chem. 2]

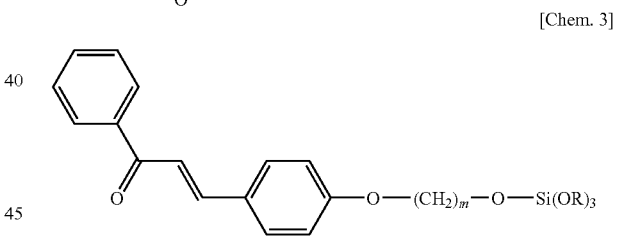

[Chem. 3]

In Chem. 2 and Chem. 3, m represents an integer in the range of 3 to 20, and R represents an alkyl group having 1 to 4 carbon atoms.

Specific examples of the film compound having a chalconyl group that can be used include alkoxysilane compounds represented by (1) to (8) below.

(1) $(C_6H_5)(CH)_2CO(C_6H_4)O(CH_2)_6OSi(OCH_3)_3$
(2) $(C_6H_5)(CH)_2CO(C_6H_4)O(CH_2)_6OSi(OC_2H_5)_3$
(3) $(C_6H_5)(CH)_2CO(C_6H_4)O(CH_2)_8OSi(OCH_3)_3$
(4) $(C_6H_5)(CH)_2CO(C_6H_4)O(CH_2)_8OSi(OC_2H_5)_3$
(5) $(C_6H_5)CO(CH)_2(C_6H_4)O(CH_2)_6OSi(OCH_3)_3$
(6) $(C_6H_5)CO(CH)_2(C_6H_4)O(CH_2)_6OSi(OC_2H_5)_3$
(7) $(C_6H_5)CO(CH)_2(C_6H_4)O(CH_2)_8OSi(OCH_3)_3$
(8) $(C_6H_5)CO(CH)_2(C_6H_4)O(CH_2)_8OSi(OC_2H_5)_3$

Note that, in (1) to (8) above, $(C_6H_5)CO(CH)_2(C_6H_4)$ represents a 4-chalconyl group $(C_6H_5—CO—CH=CH—C_6H_4—)$, and $(C_6H_5)(CH)_2CO(C_6H_4)$ represents a 4'-chalconyl group $(C_6H_5—CH=CH—CO—C_6H_4—)$.

The monomolecular film 13 of the first film compound is formed by applying a reaction mixture containing an alkoxysilane compound having a chalconyl group, a condensation catalyst for accelerating a condensation reaction between an alkoxysilyl group and a hydroxyl group 23 disposed on a surface of the first base material 21, and a nonaqueous organic solvent on the surface of the first base material 21, and allowing the reaction mixture to react in air at room temperature. The application can be performed using any method such as a doctor blade method, a dip-coating method, a spin-coating method, a spray method, a screen printing method, or an ink jet printing method.

As the condensation catalyst, a metal salt such as a carboxylic acid metal salt, a carboxylate metal salt, a carboxylic acid metal salt polymer, a carboxylic acid metal salt chelate, a titanate, or a titanate chelate can be used.

The amount of condensation catalyst added is preferably in the range of 0.2 to 5 mass percent, and more preferably in the range of 0.5 to 1 mass percent of the alkoxysilane compound.

Specific examples of the carboxylic acid metal salt include stannous acetate, dibutyltin dilaurate, dibutyltin dioctoate, dibutyltin diacetate, dioctyltin dilaurate, dioctyltin dioctoate, dioctyltin diacetate, stannous dioctoate, lead naphthenate, cobalt naphthenate, and iron 2-ethylhexenoate.

Specific examples of the carboxylate metal salt include dioctyltin bisoctyl thioglycolate and dioctyltin maleate.

Specific examples of the carboxylic acid metal salt polymer include dibutyltin maleate polymers and dimethyltin mercaptopropionate polymers.

Specific examples of the carboxylic acid metal salt chelate include dibutyltin bisacetylacetate and dioctyltin bisacetyllaurate.

Specific examples of the titanate include tetrabutyl titanate and tetranonyl titanate.

A specific example of the titanate chelate is bis(acetylacetonyl)dipropyl titanate.

A condensation reaction between the alkoxysilyl group and the hydroxyl group 23 disposed on the surface of the first base material 21 occurs to produce the monomolecular film 23 which is made of the film compound having a chalconyl group and which has the structure represented by Chem. 4 below. Three single bonds extending from oxygen atoms are bonded to silicon (Si) atoms of the surface of the first base material 21 or silicon atoms of an adjacent silane compound. Among the three single bonds, at least one single bond is bonded to a silicon atom of the surface of the first base material 21.

[Chem. 4]

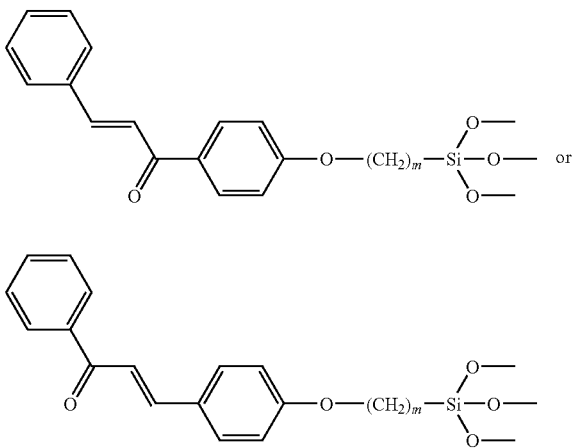

The reaction is preferably performed in air with a relative humidity of 45% or less because the alkoxysilyl group is decomposed in the presence of moisture. Note that the condensation reaction is inhibited by grease and moisture adhered to the surface of the first base material 21. Therefore, it is preferable that these impurities are removed in advance by sufficiently washing and then drying the first base material 21.

In the case where any one of the above-mentioned metal salts is used as the condensation catalyst, the time required for completing the condensation reaction is about two hours.

In the case where one or more compounds selected from the group consisting of ketimine compounds, organic acids, aldimine compounds, enamine compounds, oxazolidine compounds, and aminoalkylalkoxysilane compounds are used as the condensation catalyst instead of the above-mentioned metal salts, the reaction time can be reduced to about ½ to ⅔.

Alternatively, when these compounds are used as a cocatalyst as a mixture with the above-mentioned metal salts (these compounds can be used in a mass ratio in the range of 1:9 to 9:1, but the mass ratio is preferably about 1:1), the reaction time can be further reduced.

For example, when the monomolecular film 13 of the first film compound is formed under the same conditions except that H3 manufactured by Japan Epoxy Resins Co., Ltd., which is a ketimine compound, is used as the condensation catalyst instead of dibutyltin bisacetylacetate, which is a carboxylic acid metal salt chelate, the reaction time can be reduced to about one hour without impairing the quality of the epoxidized first base material 21.

Furthermore, when the monomolecular film 13 of the first film compound is formed under the same conditions except that a mixture (mixing ratio: 1:1) of H3 manufactured by Japan Epoxy Resins Co., Ltd. and dibutyltin bisacetylacetonate is used as the condensation catalyst, the reaction time can be reduced to about 20 minutes.

Examples of the ketimine compound that can be used here include, but are not particularly limited to, 2,5,8-triaza-1,8-nonadiene, 3,11-dimethyl-4,7,10-triaza-3,10-tridecadiene, 2,10-dimethyl-3,6,9-triaza-2,9-undecadiene, 2,4,12,14-tetramethyl-5,8,11-triaza-4,11-pentadecadiene, 2,4,15,17-tetramethyl-5,8,11,14-tetraaza-4,14-octadecadiene, and 2,4,20,22-tetramethyl-5,12,19-triaza-4,19-trieicosadiene.

Examples of the organic acid that can be used include, but are also not particularly limited to, formic acid, acetic acid, propionic acid, butyric acid, and malonic acid.

In producing the reaction mixture, an organochlorine solvent, a hydrocarbon solvent, a fluorocarbon solvent, a silicone solvent, and a mixed solvent thereof can be used. In order to prevent hydrolysis of the alkoxysilane compound, it is preferable that moisture is removed in advance from the solvent used using a desiccant or by distillation. The boiling point of the solvent is preferably in the range of 50° C. to 250° C.

Specific examples of the solvent that can be used include nonaqueous petroleum naphtha, solvent naphtha, petroleum ether, petroleum benzine, isoparaffin, normal paraffin, decalin, industrial gasoline, nonane, decane, heating oil, dimethyl silicone, phenyl silicone, alkyl-modified silicone, polyether silicone, and dimethylformamide.

Furthermore, an alcohol solvent such as methanol, ethanol, or propanol, or a mixture thereof can also be used.

Examples of the fluorocarbon solvent that can be used include flon solvents, Fluorinert (manufactured by 3M in the United States), and Aflude (manufactured by Asahi Glass Co., Ltd.). These may be used alone or in combinations of two or more solvents that can be sufficiently mixed with each other. Furthermore, an organochlorine solvent such as dichloromethane or chloroform may be added.

A preferable concentration of the alkoxysilane compound in the reaction mixture is in the range of 0.5 to 3 mass percent.

After the reaction, washing is performed with a solvent to remove excess alkoxysilane compound and condensation catalyst remaining on the surface as unreacted products. Consequently, the monomolecular film 13 of the first film compound is formed on the first joining surface 11. A schematic view of the vicinity of the first joining surface 11 on which the monomolecular film 13 of the first film compound is thus formed is shown in FIG. 2.

Any solvents that can dissolve the alkoxysilane compound can be used as the washing solvent. For example, dichloromethane, chloroform, or N-methylpyrrolidone, which is inexpensive, which can solve alkoxysilane, and which can be easily removed by air drying is preferable.

After the reaction, when the first base material 21 is left to stand in air without washing with a solvent, a portion of the alkoxysilane compound remaining on the surface is hydrolyzed by moisture in air, and a condensation reaction between a resulting silanol group and an alkoxysilyl group occurs. As a result, an ultrathin polymer film made of polysiloxane is formed on the surface of the first joining surface 11. This polymer film is not necessarily completely fixed on the surface of the first joining surface 11 by covalent bonding. However, the polymer film contains a chalconyl group, and thus has a reactivity similar to that of the monomolecular film 13 of the first film compound. Therefore, even if washing is not performed, no particular problem occurs in the subsequent production process.

In this embodiment, an alkoxysilane compound having a chalconyl group is used. Alternatively, a chlorosilane compound in which a diacetylene group is disposed at an end of a straight-chain alkylene group and a chlorosilyl group is disposed at another end thereof, and which is represented by a general formula (Chem. 5) below may be used.

[Chem. 5]

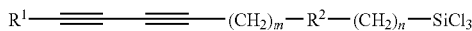

$R^1$——≡≡——≡≡——$(CH_2)_m$—$R^2$—$(CH_2)_n$—$SiCl_3$

In Chem. 5, m and n each independently represent an integer in the range of 2 to 20, $R^1$ represents hydrogen or an alkyl group having 1 to 4 carbon atoms, and $R^2$ represents a —$Si(CH_3)_2$— group or a covalent bond.

A diacetylene group forms covalent bonds by a photopolymerization reaction as shown in a general formula (Chem. 6) below. Note that, in Chem. 6, R and R' each represent any functional group.

[Chem. 6]

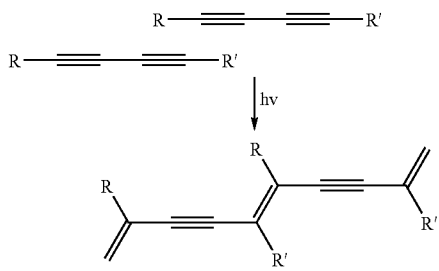

Specific examples of the film compound having a diacetylene group that can be used include chlorosilane compounds represented by (11) to (16) below.

(11) $CH{\equiv}C{-}C{\equiv}C(CH_2)_{15}SiCl_3$
(12) $CH{\equiv}C{-}C{\equiv}C(CH_2)_2Si(CH_3)_2(CH_2)_{15}SiCl_3$
(13) $CH{\equiv}C{-}C{\equiv}C(CH_2)_2Si(CH_3)_2(CH_2)_9SiCl_3$
(14) $C_4H_9C{\equiv}C{-}C{\equiv}C(CH_2)_{15}SiCl_3$
(15) $C_4H_9C{\equiv}C{-}C{\equiv}C(CH_2)_2Si(CH_3)_2(CH_2)_{15}SiCl_3$
(16) $C_4H_9C{\equiv}C{-}C{\equiv}C(CH_2)_2Si(CH_3)_2(CH_2)_9SiCl_3$ In the case where a chlorosilane compound is used, the type of solvent that can be used, reaction conditions, and the reaction time are the same as those in the case of an alkoxysilane compound, except that neither a condensation catalyst nor a cocatalyst is necessary, alcohol solvents cannot be used, and a reaction is performed in dry air (relative humidity of 30% or less) using a dry solvent because chlorosilane compounds are readily hydrolyzed compared with alkoxysilane compounds. Accordingly, a description thereof is omitted.

In this embodiment, glass is used as the first base material. Alternatively, a metal such as aluminum, ceramics, or a synthetic resin such as an acrylic resin or polycarbonate can also be used.

When the base material has an active hydrogen group such as a hydroxyl group or an amino group on the surface thereof, an alkoxysilane compound can be used as the film compound as in the case of glass. Specific examples of such a base material include metals such as aluminum and ceramics.

When a synthetic resin is used as the base material, by performing a treatment, for example, grafting a compound having an active hydrogen group by a plasma treatment or the like, an alkoxysilane compound can be used in some cases.

FIG. 1 shows a schematic view of the case where a monomolecular film of a film compound having a chalconyl group is formed on the entire surface of the first base material. Alternatively, the reaction mixture can be selectively applied onto only on the first joining surface using a screen printing method, an ink jet printing method, or the like. In this case, the monomolecular film is not formed in an area of a channel of a solution. Accordingly, the biochemical chip according to the present invention can also be suitably used even in the case where a compound that reacts with a photoreactive functional group or a coupling reactive group contained in the monomolecular film is used.

(The above is related to step A)

In step B, a film compound having a chalconyl group is brought into contact with a second joining surface 12 of a second base material 22 made of glass to form a monomolecular film 14 of the film compound having a chalconyl group on the surface of the second joining surface 12 (see FIG. 2). The film compound that can be used, reaction conditions, and the like are the same as those in step A, and thus a detailed description thereof is omitted.

(The above is related to step B)

In step C, first, a coupling agent is brought into contact with the monomolecular film 13 of the first film compound in the form of a monomolecular film formed by using an LB method or the like to form a covalent bond by photodimerization of chalconyl groups, thereby forming a coating film 15 of the coupling agent on the surface of the monomolecular film 13 of the first film compound (see FIG. 3), and the first joining surface 11 further having the coating film 15 of the coupling agent thereon is then brought into contact by pressure with the second joining surface 12 having the monomolecular film 14 of the second film compound thereon to form a covalent bond by photodimerization of chalconyl groups (see FIG. 3).

Here, instead of forming the monomolecular film 15 of the coupling agent, a reaction mixture prepared by mixing a coupling agent and a solvent may be applied onto the monomolecular film 13 of the first film compound formed on the first joining surface 11, and a reaction may then be performed by light irradiation. In this case, the resulting coating film of the coupling agent is not formed as a monomolecular film. In order to prevent a groove-like or hole-like fluid channel having a size on the order of micrometers from being clogged, the application is performed by a selective application method such as a screen printing method.

In producing the reaction mixture, any solvent that can dissolve the coupling agent can be used. In view of the price, the volatility at room temperature, the toxicity, and the like, a lower alcohol solvent such as isopropyl alcohol or ethanol is preferable.

The amount of coupling agent added, the concentration of the mixture applied, the reaction temperature, and the reaction time are appropriately adjusted in accordance with, for example, the types of base material and film compound used.

The first joining surface 11 further having the coating film 15 of the coupling agent thus obtained thereon and the second joining surface 12 having the monomolecular film 14 of the second film compound thereon are brought into contact with each other by pressure, and irradiated with light. Consequently, the first joining surface 11 is adhered to the second joining surface 12 via a bond formed between a chalconyl group on the monomolecular film 14 of the second film compound formed on the second joining surface 12 and a chalconyl group covering the first joining surface 11, and thus the biochemical chip 10 is obtained (see FIG. 1). Each of the first base material 21 and the second base material 22 is made of glass, which has a light-transmissive property. Therefore, light irradiation onto the first joining surface 11 and the second joining surface 12 can be conducted through either one of or both of the first base material 21 and the second base material 22.

As a light source, any ultraviolet source used in photolithography, photopolymerization, or the like can be used. Examples thereof include a high-pressure mercury-vapor lamp and a xenon lamp.

Examples of the coupling agent that can be used in this embodiment include α,ω-dichalconyl aliphatic dicarboxylate represented by a general formula below:

CnOCO—(CH$_2$)$_m$—COOCn (wherein m represents an integer in the range of 1 to 20, and Cn represents either a 4-chalconyl group or a 4'-chalconyl group) and polymers having a chalconyl group in the side chain and represented by Chem. 7 below.

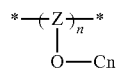

[Chem. 7]

Note that n represents any integer of 2 or more, and preferably an integer in the range of 2 to 500, and Cn represents either a 4-chalconyl group or a 4'-chalconyl group.

Specific examples of the polymer having a chalconyl group and represented by Chem. 7 include polyacrylic acid (Z═—CH$_2$CH—COO—) and polymethacrylic acid (Z═—CH$_2$C(CH$_3$)—COO—).

In this embodiment, a description is made of the case where a film compound having a chalconyl group as a photoreactive functional group is used. When a film compound having a diacetylene group as a photoreactive functional group is used, a coupling agent having, as the coupling reactive groups, two or more diacetylene groups is used.

In this embodiment, first and second base materials made of transparent glass are used. Alternatively, when an opaque material is used as the first base material and the second base material, light irradiation is conducted from a side surface of the joined first and second base materials in a direction orthogonal to the first and second joining surfaces that were brought into contact with each other by pressure. In this step, it is preferable that the irradiated light is converged near the joining surfaces using an optical fiber or the like.

(The above is related to step C)

A biochemical chip and a method of producing the same have been described here. An optical component can also be produced by the same method, and thus a detailed description thereof is omitted.

EXAMPLES

Examples performed in order to verify the advantages of the present invention will be described below, but the present invention is not limited to these examples. In these examples, production of a biochemical chip and lens including a glass base material will be described as typical examples.

Example 1

Production of Biochemical Chip (1) Formation of Monomolecular Film of Film Compound Having Chalconyl Group on Joining Surfaces of Biochemical Chip Substrates A pair of glass biochemical chip substrates (a channel having a channel width in the range of 10 to 100 μm and a depth of about 50 μm was formed on one of the substrates by photolithography and wet etching) were prepared, sufficiently washed and then dried.

Subsequently, 0.99 parts by weight of 1-trimethoxysilyloxy-6-(4-chalconyloxy)hexane (Chem. 8) and 0.01 parts by weight of dibutyltin bisacetylacetonate (condensation catalyst) were weighed and then dissolved in 100 parts by weight of hexamethyldisiloxane to prepare a reaction mixture.

C$_6$H$_5$—═—CO—C$_6$H$_4$—O—(CH$_2$)$_6$—OSiCl$_3$ [Chem. 8]

The reaction mixture thus prepared was applied onto a joining surface of each of the substrates and allowed to react in dry air (relative humidity: 30% or less) for about two hours. Subsequently, washing was performed with chloroform to remove excess alkoxysilane compound and dibutyltin bisacetylacetonate. A monomolecular film (having a thickness of about 1 nanometer) of the film compound having a chalconyl group was formed over the entire joining surfaces.

(2) Formation of Monomolecular Film of Coupling Agent Having Chalconyl Groups

An ethanol solution of 1,4-bis(4-chalconyl) adipate CnOCO—(CH$_2$)$_4$—COOCn (wherein Cn represents a 4-chalconyl group) having a chalconyl group at each end of its molecule was applied onto one of the epoxidized biochemical chip substrates on which the monomolecular film was formed in (1) by a screen printing method such that a groove-like or hole-like fluid channel having a size of micrometers level was not clogged. Primary light irradiation was conducted using a high-pressure mercury-vapor lamp (so as not to complete the coupling reaction), and the substrate was then washed with ethanol. Consequently, a coating film of the coupling agent having chalconyl groups was further formed on the surface of the monomolecular film of the film compound.

(3) Adhesion with Biochemical Chip Substrate

The biochemical chip substrate on which the monomolecular film of the film compound having a chalconyl group was formed in (1) and the biochemical chip substrate on which the monomolecular film of the coupling agent having chalconyl groups was formed in (2) were disposed so that the joining surfaces faced each other and brought into contact with each other by pressure. Subsequently, secondary light irradiation was conducted using a high-pressure mercury-vapor lamp to completely perform curing. Consequently, a biochemical chip was obtained.

Example 2

Production of Cemented Lens

Adhesion of a cemented lens was achieved by the same method as in Example 1 using two lenses for a cemented lens. Regarding the resulting cemented lens, discoloration, distortion of the field of view, aberration, interference fringe formation, or the like was not observed.

REFERENCE NUMERALS

10: biochemical chip, 11: first joining surface, 12: second joining surface, 13: monomolecular film of a first film compound, 14: monomolecular film of a second film compound, 15: coating film of a coupling agent, 21: first base material, 22: second base material, 23: hydroxyl group

The invention claimed is:

1. A method of adhering a first joining surface of a first member to a second joining surface of a second member, comprising:

bringing a first film compound having a first photoreactive functional group at an end of its molecule and a first surface bonding group at another end thereof into contact with the first joining surface to form a covalent bond between the first surface bonding group and a surface functional group of the first joining surface so as to form a coating film of the first film compound on the first joining surface;

bringing a second film compound having a second photoreactive functional group at an end of its molecule and a second surface bonding group at another end thereof into contact with the second joining surface to form a covalent bond between the second surface bonding group and a surface functional group of the second joining surface so as to form a coating film of the second film compound on the second joining surface; and bringing the first joining surface having the coating film of the first film compound thereon into contact by pressure with the second joining surface having the coating film of the second film compound thereon while setting a coupling agent having at least one first coupling reactive group that forms a covalent bond with the first photoreactive functional group by light irradiation and at least one second coupling reactive group that forms a covalent bond with the second photoreactive functional group by light irradiation to be in contact with the first functional photoreactive group and the second photoreactive functional group, and conducting light irradiation to form covalent bonds: between the first photoreactive functional group and the first coupling reactive group; and between the second photoreactive functional group and the second coupling reactive group, wherein the first photoreactive functional group and the second photoreactive functional group are selected from the group consisting of a chalconyl group and a cinnamoyl group, or wherein the first photoreactive functional group and the second photoreactive functional group are selected from a diacetylene group.

2. The method of adhering according to claim 1, wherein light irradiation is conducted while setting the coupling agent to be in contact with the coating film of the first film compound formed on the first joining surface to form a covalent bond between the first photoreactive functional group and the first coupling reactive group, to form a coating film of the coupling agent on the surface of the coating film of the first film compound, and light irradiation is then conducted while setting the first joining surface further having the coating film of the coupling agent thereon to be in contact by pressure with the second joining surface having the coating film of the second film compound thereon, to form a covalent bond between the second photoreactive functional group and the second coupling reactive group.

3. The method of adhering according to claim 1, wherein each of the first surface bonding group and the second surface bonding group is either an alkoxysilyl group or a chlorosilyl group.

4. The method of adhering according to claim 1, wherein either one or both of the first member and the second member are transparent, and the light irradiation is conducted through the transparent member.

5. A biochemical chip comprising:

a first member and a second member, wherein, on a first joining surface of the first member, a coating film of a first film compound having a first photoreactive functional group at an end of its molecule and bonded to the first joining surface at another end thereof is provided, on a second joining surface of the second member, a coating film of a second film compound having a second photoreactive functional group at an end of its molecule and bonded to the second joining surface at another end thereof is provided, the first photoreactive functional group and the second photoreactive functional group are bonded to each other via bonds formed: between the first photoreactive functional group and a coupling agent having at least one first coupling reactive group that forms a covalent bond by a coupling reaction with the first photoreactive functional group and at least one second coupling reactive group that forms a covalent bond by a coupling reaction with the second photoreactive functional group; and between the second photoreactive functional group and the coupling agent, and the first joining surface is adhered to the second joining surface via the formed bonds, wherein the first photoreactive functional group and the second photoreactive functional group are selected from the group consisting of a chalconyl group and a cinnamoyl group, or wherein the first photoreactive functional group and the second photoreactive functional group are selected from a diacetylene group.

6. The biochemical chip according to claim 5, wherein each of the coating film of the first film compound and the coating film of the second film compound is a monomolecular film.

7. The biochemical chip according to claim 5, wherein the first film compound and the second film compound are represented by a general formula selected from the group consisting of [Chem. 2] or [Chem. 3]:

[Chem. 2]

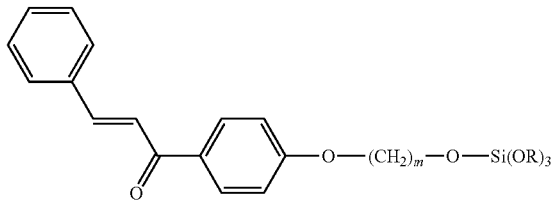

[Chem. 3]

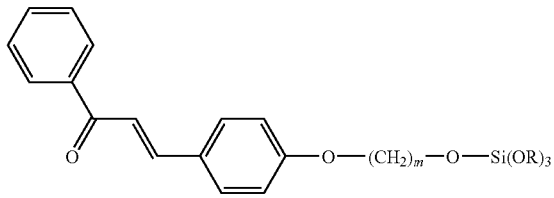

wherein, m represents an integer in the range of 3 to 20 and R represents an alkyl group having 1 to 4 carbon atoms.

8. The biochemical chip according to claim 7, wherein the first film compound and the second film compound are selected from the group consisting of:
(1) $(C_6H_5)(CH)_2CO(C_6H_4)O(CH_2)_6OSi(OCH_3)_3$;
(2) $(C_6H_5)(CH)_2CO(C_6H_4)O(CH_2)_6OSi(OC_2H_5)_3$;
(3); $(C_6H_5)(CH)_2CO(C_6H_4)O(CH_2)_8OSi(OCH_3)_3$;
(4) $(C_6H_5)(CH)_2CO(C_6H_4)O(CH_2)_6OSi(OC_2H_5)_3$;
(5) $(C_6H_5)CO(CH)_2(C_6H_4)O(CH_2)_6OSi(OCH_3)_3$;
(6) $(C_6H_5)CO(CH)_2(C_6H_4)O(CH_2)_6OSi(OC_2H_5)_3$;
(7) $(C_6H_5)CO(CH)_2(C_6H_4)O(CH_2)_8OSi(OCH_3)_3$; and
(8) $(C_6H_5)CO(CH)_2(C_6H_4)O(CH_2)_6OSi(OC_2H_5)_3$.

9. The biochemical chip according to claim 5, wherein the first film compound and the second film compound are represented by the general formula [Chem. 5]:

[Chem. 5]

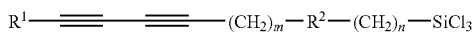

$$R^1\!\!-\!\!\equiv\!\!-\!\!\equiv\!\!-\!(CH_2)_m\!-\!R^2\!-\!(CH_2)_n\!-\!SiCl_3$$

wherein, m and n each independently represent an integer in the range of 2 to 20, $R^1$ represents hydrogen or an alkyl group having 1 to 4 carbon atoms, and $R^2$ represents a —$Si(CH_3)_2$— group or a covalent bond.

10. The biochemical chip according to claim 9, wherein the first film compound and the second film compound are selected from the group consisting of:
(1) $CH\!\equiv\!C\!-\!C\!\equiv\!C(CH_2)_{15}SiCl_3$;
(2) $CH\!\equiv\!C\!-\!C\!\equiv\!C(CH_2)_2Si(CH_3)_2(CH_2)_{15}SiCl_3$;
(3) $CH\!\equiv\!C\!-\!C\!\equiv\!C(CH_2)_2Si(CH_3)_2(CH_2)_9SiCl_3$;
(4) $C_4H_9C\!\equiv\!C\!-\!C\!\equiv\!C(CH_2)_{15}SiCl_3$;
(5) $C_4H_9C\!\equiv\!C\!-\!C\!\equiv\!C(CH_2)_2Si(CH_3)_2(CH_2)_{15}SiCl_3$; and
(6) $C_4H_9C\!\equiv\!C\!-\!C\!\equiv\!C(CH_2)_2Si(CH_3)_2(CH_2)_9SiCl_3$.

11. An optical component comprising:
a first member and a second member,
wherein, on a first joining surface of the first member, a coating film of a first film compound having a first photoreactive functional group at an end of its molecule and bonded to the first joining surface at another end thereof is provided,
on a second joining surface of the second member, a coating film of a second film compound having a second photoreactive functional group at an end of its molecule and bonded to the second joining surface at another end thereof is provided,
the first photoreactive functional group and the second photoreactive functional group are bonded to each other via bonds formed between the first photoreactive functional group and a coupling agent having at least one first coupling reactive group that forms a covalent bond by a coupling reaction with the first photoreactive functional group and at least one second coupling reactive group that forms a covalent bond by a coupling reaction with the second photoreactive functional group and between the second photoreactive functional group and the coupling agent, and the first joining surface is adhered to the second joining surface via the formed bonds, wherein the first photoreactive functional group and the second photoreactive functional group are selected from the group consisting of a chalconyl group and a cinnamoyl group, or wherein the first photoreactive functional group and the second photoreactive functional group are selected from a diacetylene group.

12. The optical component according to claim 11, wherein each of the coating film of the first film compound and the coating film of the second film compound is a monomolecular film.

* * * * *

UNITED STATES PATENT AND TRADEMARK OFFICE
CERTIFICATE OF CORRECTION

| | |
|---|---|
| PATENT NO. | : 8,334,051 B2 |
| APPLICATION NO. | : 12/601968 |
| DATED | : December 18, 2012 |
| INVENTOR(S) | : Ogawa |

It is certified that error appears in the above-identified patent and that said Letters Patent is hereby corrected as shown below:

In Column 1, Line 12, delete "entireties" and insert -- entireties. --, therefor.

In Column 1, Line 58, delete "2005-221478" and insert -- 2005-221478. --, therefor.

In Column 1, Line 60, delete "2003-246971" and insert -- 2003-246971. --, therefor.

In Column 5, Line 29, delete "so0me" and insert -- some --, therefor.

Signed and Sealed this
Twenty-sixth Day of February, 2013

Teresa Stanek Rea
*Acting Director of the United States Patent and Trademark Office*